July 2, 1963  F. R. KERNS ETAL  3,095,623
MOLDING DEVICES
Filed May 31, 1960  11 Sheets-Sheet 1

INVENTORS
FRED R. KERNS
ROBERT R. MEASE

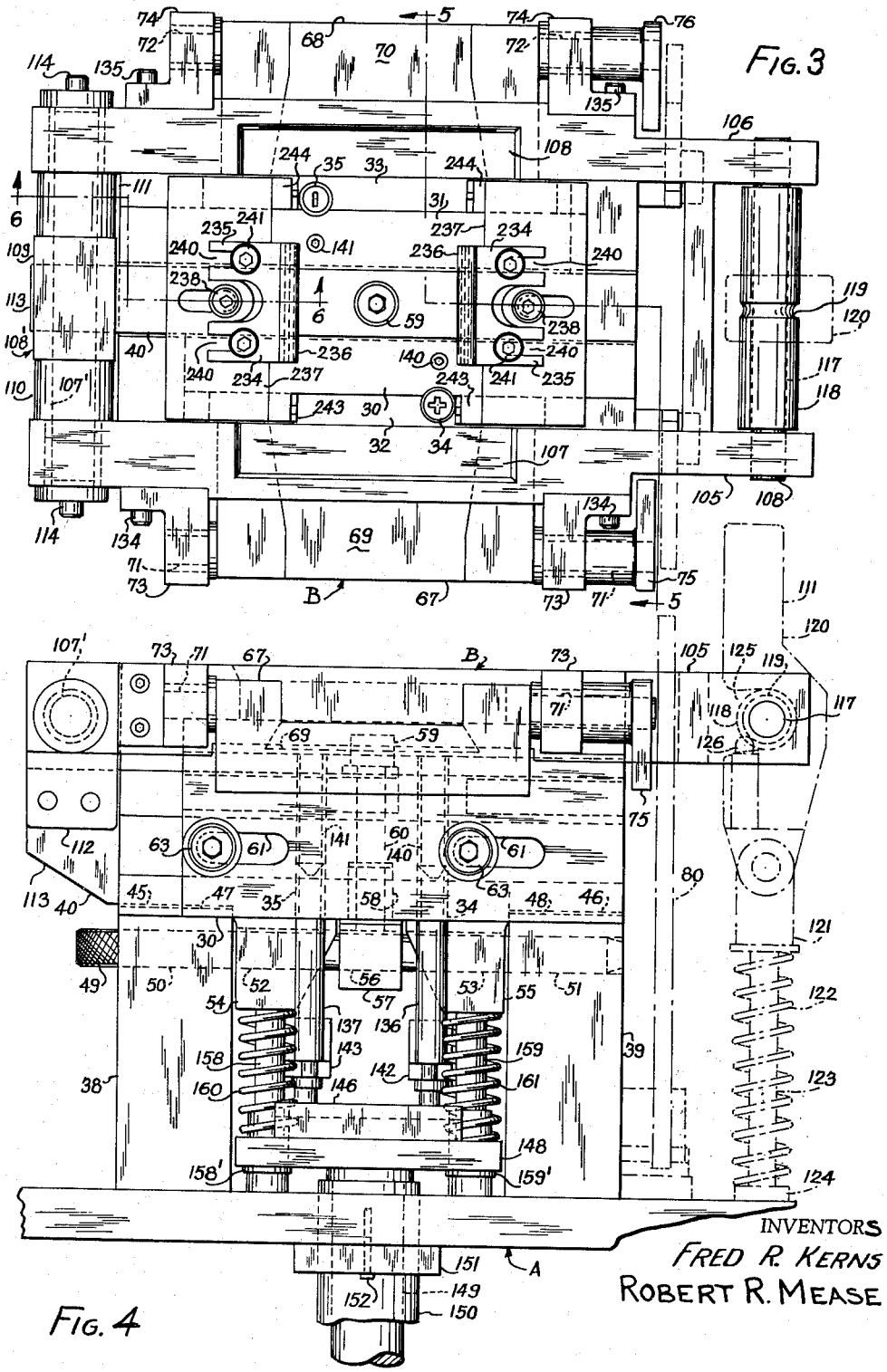

July 2, 1963  F. R. KERNS ETAL  3,095,623
MOLDING DEVICES
Filed May 31, 1960  11 Sheets-Sheet 3
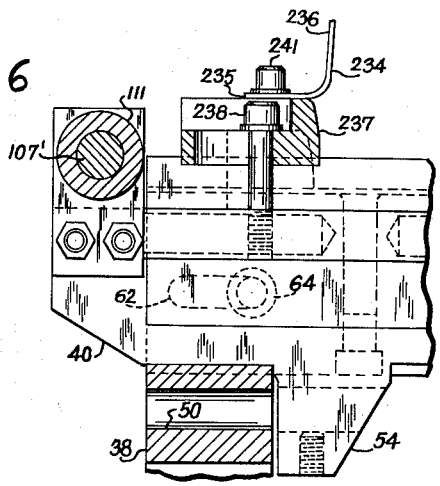
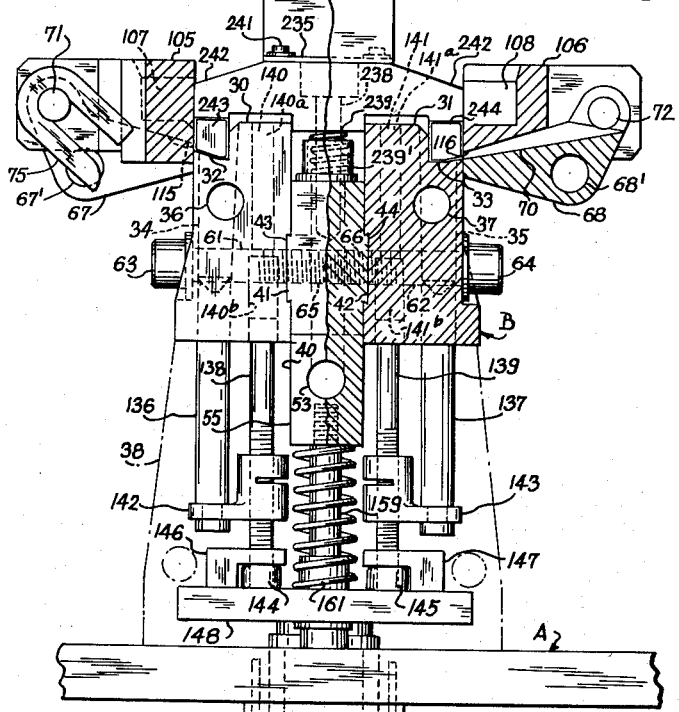
INVENTORS
FRED R. KERNS
ROBERT R. MEASE

INVENTORS
FRED R. KERNS
ROBERT R. MEASE

July 2, 1963  F. R. KERNS ETAL  3,095,623
MOLDING DEVICES

Filed May 31, 1960　　　　　　　　　　　　　11 Sheets-Sheet 5

INVENTORS
FRED R. KERNS
ROBERT R. MEASE

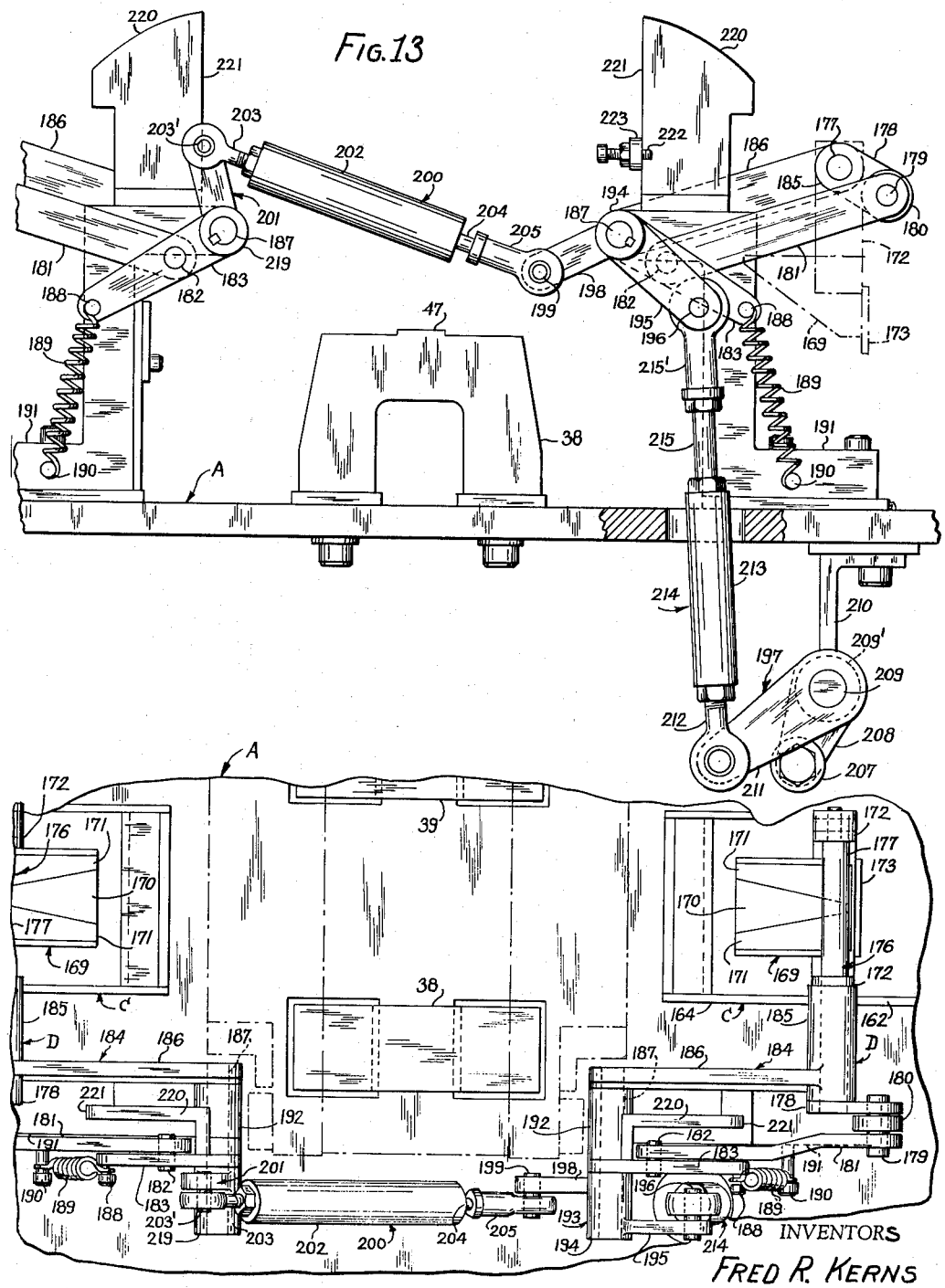

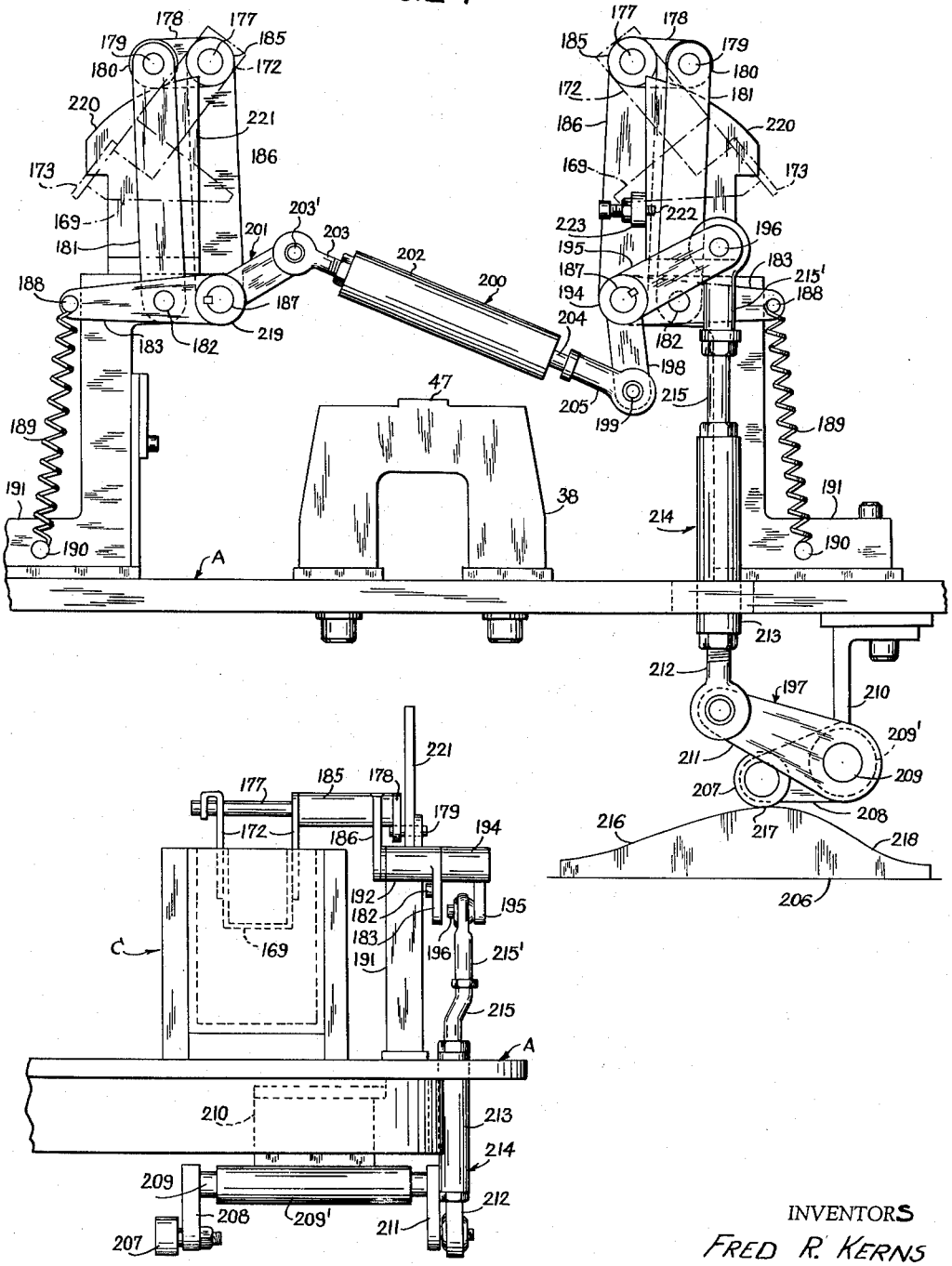

July 2, 1963  F. R. KERNS ETAL  3,095,623
MOLDING DEVICES
Filed May 31, 1960  11 Sheets-Sheet 8

INVENTORS
FRED R. KERNS
ROBERT R. MEASE

July 2, 1963    F. R. KERNS ETAL    3,095,623
MOLDING DEVICES
Filed May 31, 1960    11 Sheets-Sheet 9

INVENTORS
FRED R. KERNS
ROBERT R. MEASE

INVENTORS
FRED R. KERNS
ROBERT R. MEASE

United States Patent Office 3,095,623
Patented July 2, 1963

3,095,623
MOLDING DEVICES
Fred R. Kerns, Cleveland Heights, and Robert R. Mease, Eastlake, Ohio, assignors to The Electric Storage Battery Company, a corporation of New Jersey
Filed May 31, 1960, Ser. No. 32,997
6 Claims. (Cl. 22—155)

This invention relates to molding or casting devices and particularly to the simultaneous casting of an integral plate-connecting strap and post on the lugs of a plurality of battery plates.

An object of the present invention is the provision of a novel and improved molding or casting device for casting objects of various sizes and configurations such as electroconductive straps employed to connect together lugs depending from the storage battery plates which comprise a battery cell element.

Another of the principal objects of the present invention is the provision of a device of the character referred to including an improved mold having a number of movable parts which are moved automatically in timed relation to one another for effecting a casting operation.

Still another object of the present invention is to provide a plurality of molds of the type described, the parts of each which are adapted for operation in timed relation to one another by moveable cam means or which are adapted for operation by movement along a pre-determined path relative to fixed cam means.

A further object of the present invention is to provide a strap and post casting apparatus in which moveable gate means are adapted for guiding molten casting material into the molds and are mounted for movement toward and away from the mold cavity in coordinated movement with shearing means adapted to shear away excess casting material upon hardening.

A still further object of the present invention is to provide ladles in which are adapted to receive molten material and deliver the same to the mold cavities by means of moveable casting gates.

The invention resides in certain constructions, combinations and arrangements of parts and further objects and advantages will be apparent from the following description of embodiments described with reference to the accompanying drawings forming a part of the specification in which similar reference characters designate corresponding parts and in which FIG. 1 is a view in top plan with parts removed and parts broken away of a molding device in accordance with the present invention in which the molds are adapted for movement relative to fixed cam means;

FIG. 3 is a view in top plan of a mold employed in the device in FIG. 1;

FIG. 4 is a view in side elevation of the mold shown in FIG. 3;

FIG. 5 is a view taken along the line 5—5 of FIG. 3 with parts shown in section;

FIG. 6 is a view taken along the line 6—6 of FIG. 3 with parts shown in section;

FIG. 12 is a view in top plan of a portion of the molding device showing the means and mechanism for storing molding material and for pouring the stored material into the mold cavities;

FIG. 13 is a view in front elevation of the pouring mechanism illustrated in FIG. 12;

FIG. 14 is a view similar to FIG. 13 showing parts of the pouring mechanism in different positions than the positions thereof shown in FIG. 13;

FIG. 15 is a view in side elevation of a portion of the pouring mechanism illustrated in FIG. 12;

Figure 1:
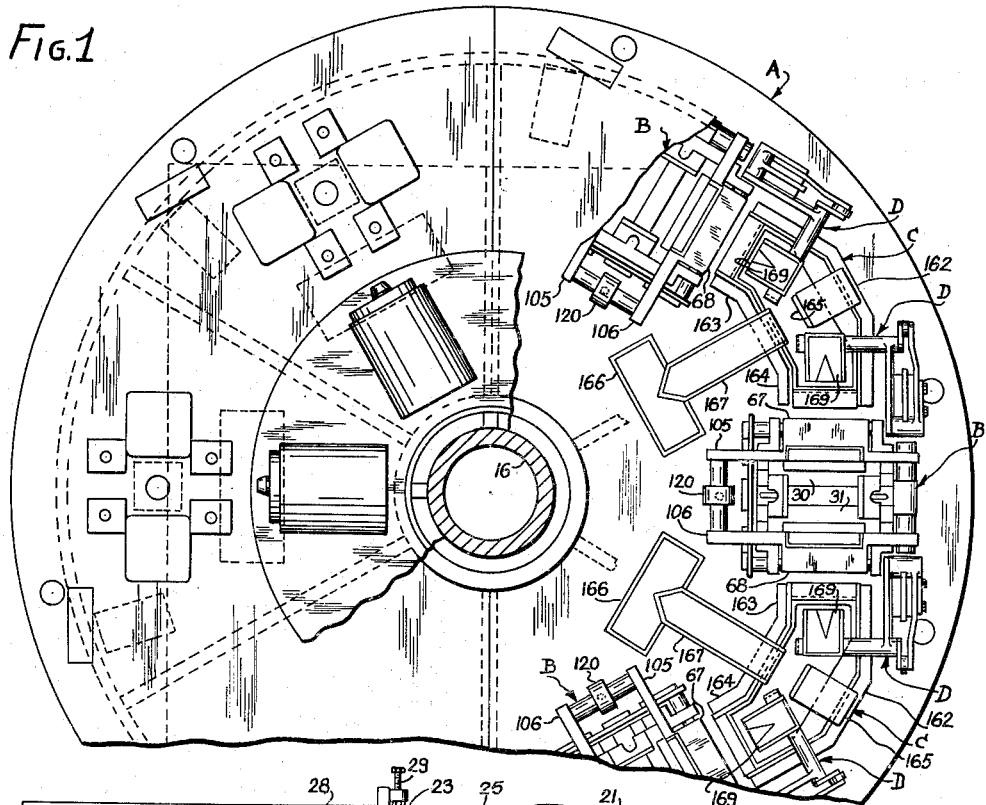

Although the molding or casting device of the present invention may be utilized for casting a variety of objects, it is preferably employed for casting electro-conductive straps for connecting together the lugs of battery plates. These straps provide an electrical connection between the lugs and the device of the present invention may cast the straps integrally with posts which depend from the straps and which permit a connection to external circuits or to other posts associated with another plurality of battery plates. The straps with or without the posts may be cast directly on the lugs of battery plates received by the mold or may be connected thereto at a subsequent time.

The improved mold includes one or more mold blocks each having one or more mold cavities formed therein. The mold preferably includes a pair of mold blocks each formed with a pair of communicating mold cavities configured to form the desired casting. When the mold is utilized to cast an integral strap and post assembly for connection to battery plates the mold cavities consist of a horizontally extending strap cavity having an open side and a vertically extending post cavity communicating with the strap cavity.

The movable mold parts consist of an improved gate construction which is arranged to receive a suitable hardenable liquid molding material from a material storing and pouring assembly to guide the received material into the mold cavity. The mold also includes an improved shear device which is moveable to shear off unwanted slugs of hardened material projecting externally of the mold cavity, and a novel ejector mechanism which ejects the cast object from the mold cavity including an ejector pin slidable within the post cavity.

The moveable parts such as the gates, the shears, and the ejector pins have actuating means associated therewith permitting automatic operation of these parts in preselected timed relation to each other during a molding operation. The actuating means may be operated in any desired manner and preferably include cam follower means which cooperate with suitable cam means effective to cause movement of the parts. The mold together with the cam follower means may be mounted for movement along a predetermined path to cooperate with stationary cam means so that the actuating means are operated automatically in the desired timed relation during movement of the mold. In the preferred embodiment, however, the mold is stationary and the cam follower means are actuated by moveable cam means.

Provision is also made for pouring liquid molding material automatically into the mold cavities. For this purpose an improved pouring mechanism is provided including a dipper which is automatically movable in response to operation of actuating means to receive material from a container and to pour the received material into the mold cavity. In applications wherein a pair of mold blocks is employed, then a pair of dippers are utilized and the actuating means is designed to effect the simultaneous movement of the dippers to pour material into the associated mold cavities. The pouring mechanism is preferably operated by a cam and cam follower arrangement engageable at preselected intervals.

The molding device of the present invention may be employed to mold or cast objects of any desired size and configuration and by way of example will be described herein as applied to the casting of an integral strap and post assembly to lugs of battery plates. In the embodiment about to be described the molding device includes a supporting structure which mounts one or more molds for movement along a preselected path during the molding operation. However, in the preferred and later described embodiment the molds are stationarily mounted.

Referring now to the drawings, there is illustrated in FIG. 1 one embodiment of a molding device constructed in accordance with the teachings of the present invention in which a mold supporting structure A is mounted for movement. In this embodiment the structure A is in the form of a turntable of generally circular configuration which is mounted for rotation about an axis. It is understood that the structure A may assume other forms and may be movable along any desired path, such as a straight line path. The turntable A is designed to support one or more mold assemblies B for rotation therewith. A plurality of mold assemblies are preferably utilized with the mold assemblies mounted on the upper surface of the turntable A spaced angularly about the axis of rotation of the turntable. The mold assemblies are designed to receive a suitable liquid molding material from a plurality of tanks or containers C.

As viewed in FIG. 1, the tanks C each is positioned in the space between a separate pair of the mold assemblies B and have associated therewith a plurality of dipper means D for removing material from the containers C and pouring such removed material into the mold cavities of the mold assemblies B. As shown in FIG. 1, a pair of dipper means D is associated with each of the tanks C to pour molding material into the adjacent mold assemblies B. Each of the mold assemblies is mounted upon a separae pie-shaped sector which is secured to the turntable. In the illustrated embodiment six mold assemblies are employed but more or less may be utilized as desired.

Figure 8:
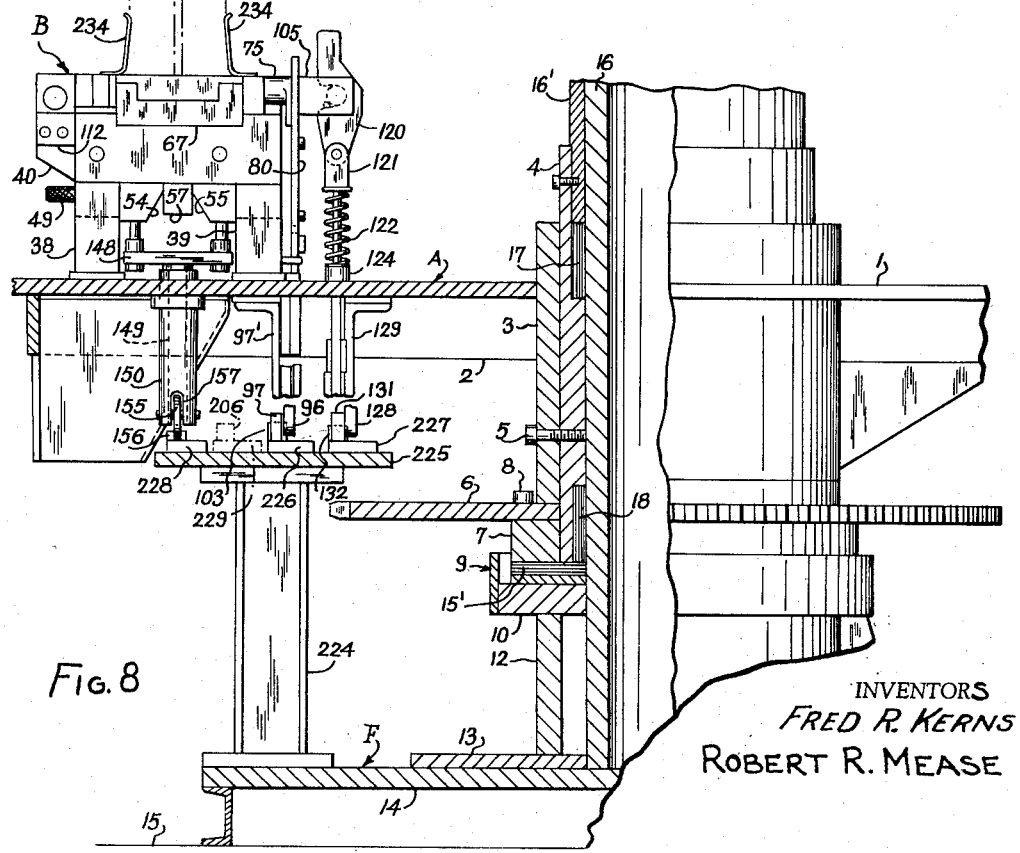
FIG. 8 is a view in side elevation of a portion of the molding device with parts shown in section showing the supporting structure for the turntable and one of the molds.

The turntable A is rotated by means of a driving mechanism E located beneath the turntable to effect turning of the turntable and movement of the mold assemblies B therewith at the desired speed. The driving mechanism E is supported by a suitable fixed supporting structure F which may rest upon the floor surface of a workshop or other area. The turntable construction A consists of a flat plate 1 of generally circular configuration having a flange 2 depending therefrom, as shown in FIG. 8. The flange 2 is designed to support certain parts of the molding device and also includes a number of openings through which pass electrical wires forming portions of electrical circuits utilized in the molding device.

As best shown in FIG. 8, the plate 1 is secured to and surrounds a hollow shaft 3 which in turn surrounds a hollow bearing housing 4. The shaft 3 is secured to the housing 4 as by a plurality of screws 5. In order to effect rotation of the turntable A a suitable sprocket wheel 6 is secured to the upper surface of an annular flange 7, such as by screws 8, which flange 7 is attached in turn to the bearing housing 4 in any suitable manner, such as by welding. A hollow supporting structure 9 is positioned beneath the flange 7 and includes an annular portion 10 secured to an upright 12 which is attached to a supporting flange 13 carried by a base structure 14 seated upon the floor surface 15. The portion 10 supports a ring-shaped thrust washer 15 engaging the lower surface of the flange 7.

Figure 2:
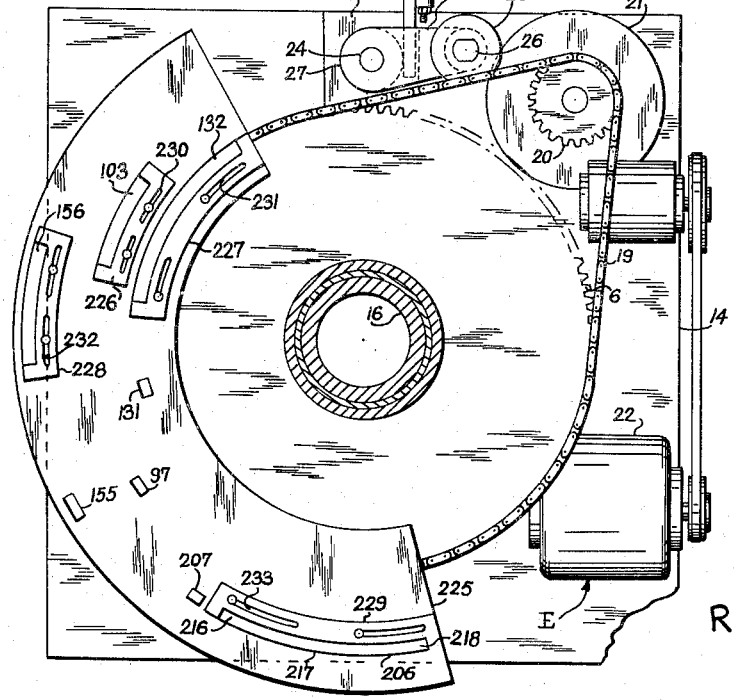
FIG. 2 is a view in top plan of a driving mechanism employed for driving the turntable of the device of FIG. 1.

A main central shaft 16 is positioned within a shaft 16' which is secured to the housing 4 to provide a center post about which the turntable is rotatable. Intermediate the housing 4 and the shaft 16 there is located a pair of ring-shaped bearings 17 and 18 seated within recesses of the housing 4 in axially spaced relation. The sprocket 6 is driven by a suitable chain 19 shown in FIG. 2 in meshing relation with the sprocket. The chain is rotated by means of a suitable gear 20 meshing with the chain and forming a portion of a suitable speed reducing mechanism 21 which is driven from an electrical motor 22. The arrangement is such that the turntable will be driven at a preselected speed to effect proper operation of the mold device, as will appear hereinafter. The mechanism 21 and motor 22 may be mounted upon the base structure 14.

In order to apply tension to the chain 19 there is provided a suitable tensioning device including a plate 23 which is mounted for pivotal movement about a pivot stud 24 towards and away from the chain 19. An idler wheel 25 is rotatably mounted by a pivot pin 26 which is secured to the plate 23. The stud 24 extends through an elongated post 27 which is supported by a support plate 28 carried by the base structure 14. A suitable adjusting screw 29 is mounted for rotation toward and away from the plate 23 to engage the plate to move the idler wheel 25 into engagement with the chain to thereby provide a desired tensioning of the chain.

In the described embodiment the molding device includes a plurality of mold assemblies carried by the turntable for casting posts and straps upon lugs of positive and negative battery plates. The molds are constructed so that they may be utilized interchangeably with a rotating turntable or with a support which moves along other paths such as a straight line, or with a stationary support as will appear hereinafter. The details of construction of the mold assemblies may now be described and since each of the mold assemblies is of identical construction only one such mold assembly will be described in detail.

Figure 16:
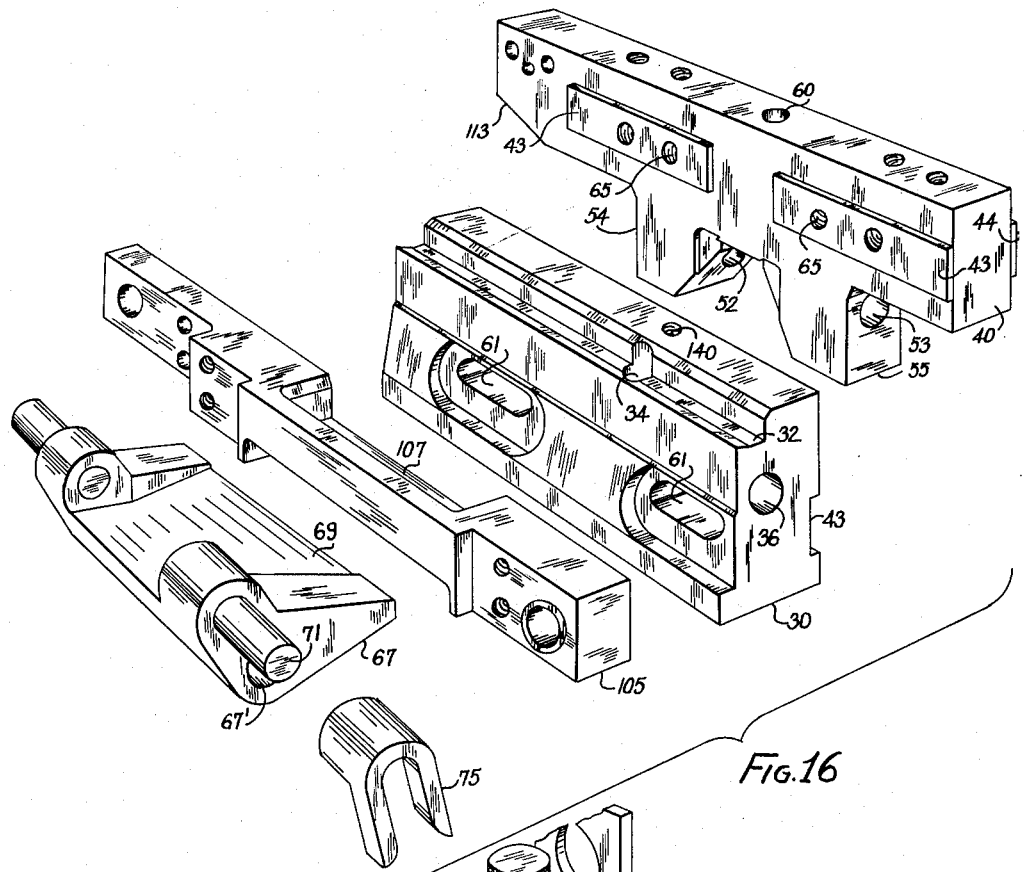
FIG. 16 is an exploded view showing parts of the mold in perspective.

The mold assembly is illustrated in detail in FIGS. 3, 4, 5 and 16 and in FIG. 16 only one half of the mold assembly is shown. The mold assembly as shown includes a pair of mold blocks 30 and 31 which are constructed with mold cavities for receiving the liquid molding material. The blocks 30 and 31 may be formed of any suitable material such as a metallic material. In the present invention each of the mold blocks includes a pair of communicating mold cavities which may be designated as strap cavities and post cavities. It is understood that straps may be cast alone without posts attached thereto in which event he post cavities may be omitted.

As illustrated in the drawings the blocks 30 and 31 include respectively strap cavities 32 and 33 and post cavities 34 and 35. The strap cavities are arranged to form the strap portions of the cast assemblies, whereas the post cavities are designed to form the post portions of the cast assemblies. It is noted with reference to the drawings that the post cavities extend transversely of the associated strap cavities and are in communication with the strap cavities at their upper open ends. As viewed in FIG. 3, the strap cavities extend throughout the length of the mold blocks parallel to each other, and the post cavities are parallel to each other on opposite sides of a central vertical plane of the mold assembly as viewed in FIG. 3.

If the straps and posts are to be cast on the lugs of battery plates during the casting operation a plurality of battery plates having the lugs attached thereto are received by the mold assembly so that the lugs of the negative plates are located within one of the strap cavities and so that the lugs of the positive plates are positioned within the other of the strap cavities. The mold blocks 30 and 31 include respectively openings 36 and 37 which are located beneath the strap cavities to extend parallel to the direction of extension of the strap cavities. These openings are proportioned to receive suitable heating elements which are effective to heat the mold blocks under control of thermocouples to assure an effective molding operation. It is observed that the strap cavities have tops and sides which are open throughout the lengths of the strap cavities.

In order to support the mold blocks in their operative positions a supporting structure is provided which includes in part a pair of supports 38 and 39 which may be of identical configuration. As best shown in FIG. 4, the supports 38 and 39 are positioned upon the upper surface of the turntable plate 1 and have the mold blocks resting upon the upper surfaces thereof. As viewed in FIG. 4 the supports 38 and 39 are spaced in a direction which is parallel to the direction of extension of the strap cavities to be positioned beneath the end portions of the mold blocks. The supports 38 and 39 may be secured to the turntable or other supporting structure in any suitable manner, such as by screws which extend upwardly from beneath the turntable into threaded openings at the bottom of the supports.

The mold blocks are supported in part also by a plate 40 which is positioned in the space between the mold blocks as shown in FIG. 5. The plate 40 includes two pairs of projections 41 and 42 located on its opposite sides which serve as keys to fit within keyways 43 and 44 formed respectively in the inner sides of the mold blocks 30 and 31. With this arrangement the mold blocks and the plate 40 are slidable with respect to one another in the direction of extension of the strap cavities. The plate 40 includes further a pair of keyways 45 and 46 in its lower surface which receive respectively keys 47 and 48 at the upper surfaces of the supports 38 and 39. As best shown in FIG. 4, a suitable clamping pin 49 extends through aligned openings 50 and 51 formed respectively in the supports 38 and 39 and also through aligned openings 52 and 53 formed in spaced depending legs 54 and 55 of the plate 40. With this construction the supports 38 and 39 carry the plate 40 through the agency of the key connections and the pin 49 with the plate 40 serving to mount the mold blocks 30 and 31.

A very rigid assembly may be provided by passing the pin 49 through an opening 56 of a clamping nut 57 having a vertically extending internally threaded part 58 into which a screw extends through a vertical passage 60 of the plate 40. The assembly of the various parts is effected when the screw 59 is rotated such that it engages the pin 49. In order to permit disassembly of parts of the mold such as the mold blocks 30 and 31 it is only necessary to rotate the screw 59 in a direction to withdraw the screw from the part 58 of the clamping nut out of engagement with the pin 49. The pin 49 may then be withdrawn from the supports 38 and 39 to thereby permit release of the plate 40 and the mold blocks 30 and 31 from the supports 38 and 39.

The mold blocks 30 and 31 may be adjusted with respect to the plate 40 by means of the cooperating keys 41 and 42 and keyways 43 and 44. Such adjustment is desirable in order to vary the position of the mold blocks with respect to other parts of the assembly. In order to permit securement of the mold blocks in their adjusted positions the mold blocks 30 and 31 include respectively pairs of slots 61 and 62 which are elongated in the direction of extension of the strap cavities, as viewed in FIGS. 4 and 16. Suitable screws 63 and 64 extend through the elongated slots into openings 65 and 66 respectively formed in the plate 40. When the screws are loosened the mold blocks may be adjusted and then locked in such adjusted positions by tightening the screws 63 and 64.

The mold assembly also includes a gate construction for guiding liquid molding material into the strap cavities 32 and 33. As will appear hereinafter, the gate construction receives material which is poured thereinto by a suitable pouring assembly. As shown in FIGS. 3, 4, 5 and 16, a pair of gates 67 and 68 which may be formed of metallic material are located each at a separate side of the mold assembly adjacent the strap cavities 32 and 33 respectively. The gates 67 and 68 include respectively trough portions 69 and 70 which are preferably highly polished and which are configured to confine the liquid material received therein and guide such material into the open sides of the strap cavities. Openings 67 and 68 are formed in the gates 67 and 68 to extend entirely therethrough for receiving suitable heating elements for heating the gates. In FIG. 5 the gates are illustrated in their operative guiding positions wherein they engage the outer sides of the mold blocks with the troughs in alignment with the bases of the strap cavities. The gates are mounted for pivotal movement about parallel axes to inoperative positions wherein they are spaced from the mold blocks, as will appear hereinafter.

The gates are supported by suitable shaft and bearing arrangements. A pair of stub shafts 71 are positioned each at a separate end of the gate 67 to extend through suitable openings in the gate in a press fit condition. In a similar manner stub shafts 72 extend through openings of the gate 68 at opposite ends thereof. These stub shafts are journalled in bearing brackets which are best shown in FIG. 3. As there illustrated a pair of bearing brackets 73 support the stub shafts 71, whereas bearing brackets 74 support the stub shafts 72. As will presently appear, the bearing brackets are mounted by the adjacent shear members which will be described in detail hereinafter.

Figure 9:
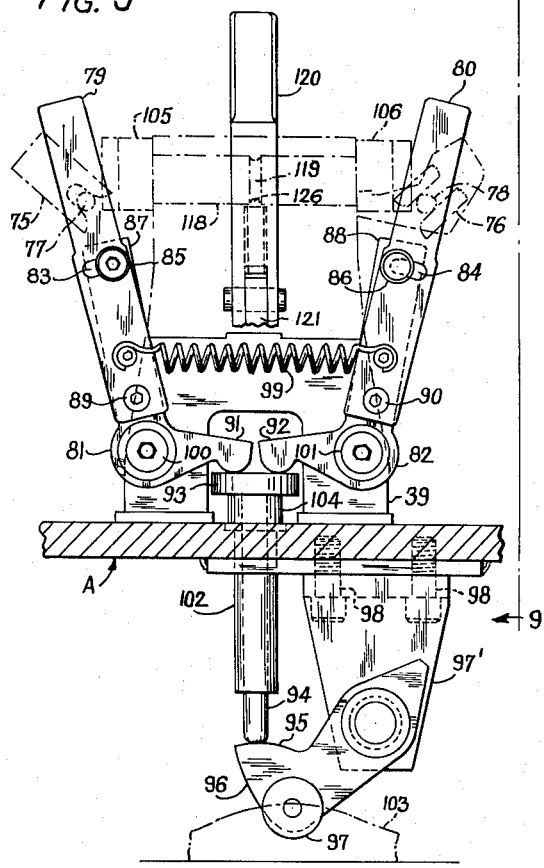
FIG. 9 is a view in rear elevation of a portion of the molding device with parts illustrated in broken lines showing the mechanism for operating the gates.

As stated previously, the gates are arranged to be pivoted about axes between operative and inoperative positions. These axes are defined by the stub shafts 71 and 72 and extend parallel to the associated strap cavities. The gates are arranged to be moved to their inoperative positions subsequent to hardening of the molding material within the mold cavities. For this purpose a pair of levers 75 and 76 are associated respectively with the gates 67 and 68. These levers are conveniently keyed upon the right hand ones of the stub shafts 71 and 72 as viewed in FIG. 3. As best shown in FIG. 9 the levers are of forked construction having pairs of legs defining passages in which are positioned suitable pins 77 and 78 which are attached respectively to elongated arms 79 and 80 which in turn are operatively connected to substantially L-shaped levers 81 and 82 associated with a cam follower arrangement.

The arms 79 and 80 include elongated slots 83 and 84 through which extend screws 85 and 86 into threaded openings of the upper portions 87 and 88 of the levers 81 and 82 with shanks in openings of the arms 79 and 80 form pivotal connections about which the arms 79 and 80 may be pivoted relative to the levers 81 and 82. The arms 79 and 80 may be adjusted relative to the levers 81 and 82 by loosening the screws 85 and 86 and locked in their adjusted positions by tightening the screws 85 and 86. This adjustment is employed to properly position the gates 67 and 68 with respect to the mold blocks. The levers 81 and 82 also include lower portions 91 and 92 which are adapted for engagement with the upper surface of a flat table 93 secured to the upper end of a pin 94 having a lower end in engagement with a peripheral surface 95 of a pivot arm 96 to which is rotatably secured a roller 97. The arm 96 is pivotally attached to a bracket 97 which is secured to the lower surface of the turntable A as by screws 98. A suitable coil spring 99 has ends connected respectively to the arms 79 and 80 so that the arms 79 and 80 are normally pulled toward each other under the action of the spring 99. The levers 81 and 82 are mounted for pivotal movement about the shanks of screws 100 and 101 which are conveniently received in openings of the support 39.

As can be realized from an inspection of FIG. 9, when the pin 94 is moved upwardly as viewed in FIG. 9, through its surrounding bushing 102, the table 93 is also moved upwardly to effect an upward movement of the portions 91 and 92 to displace the upper portions of the arms 79 and 80 outwardly against the action of the spring 99. Such movement is transmitted to the forked levers 75 and 76 through the pins 77 and 78 so that the forked lever 75 is pivoted in a clockwise direction, whereas the forked lever 76 is pivoted in a counterclockwise direction, as corresponding movement of the associated gates 67 and 68 to move these gates from their illustrated operative guiding positions to their inoperative positions wherein they are spaced from the mold blocks with the troughs 69 and 70 located beneath the bases of the strap cavities as viewed in FIG. 5.

In the embodiment under discussion the above described movement of the pin 94 is effected during rotation of the turntable by engagement of the roller 97 with a suitable fixed cam 103 described in detail more fully hereinafter. However, as will appear presently, the pin 94 may be moved in response to rotation of a cam relative to a fixed mold. The bushing 102 carries an enlarged upper portion 104 above the turntable which engages the upper surface of the turntable under the action of the spring 99 to serve as a stop. When the roller 97 passes over the camming surface of the cam 103, the parts of the gate operating mechanism are returned to the positions illustrated in FIG. 9 by action of the spring 91.

The mold device of the present invention also includes a shear construction for the purpose of shearing away unwanted slugs of hardened molding material extending externally of the strap cavities from the sides of the molding blocks. The shear means is adapted to effect its shearing action subsequent to movement of the previously described gates to their inoperative positions, which movement is effective to expose for shearing the unwanted slugs of hardened material.

As best shown in FIGS. 3 and 5, a pair of shears 105 and 106 is employed with the shears located at opposite sides of the mold structure, each adjacent a separate one of the mold blocks. The shears 105 and 106 include respectively centrally located recesses 107 and 108 provided for the purpose of receiving any overflow of liquid molding material from the associated strap cavities. As stated hereinbefore, the shears 105 and 106 are movable at preselected times during the molding operation to shear away unwanted slugs of hardened material which projects from the strap cavities outwardly of the sides of the adjacent mold blocks. For this purpose the shears are mounted for pivotal movement as a unit across the open sides of the strap cavities about an axis which extends transverse to the direction of extension of the strap cavities.

Such pivotal movement of the shears is afforded by a shaft 107 which extends loosely through suitable openings formed in the left-hand ends of the shears as viewed in FIG. 3. The shaft 107 is journalled in a bearing member 108 which has a central part 109 from which extends a pair of cylindrical parts 110 and 111 which abut the inner surfaces of the shears 105 and 106 as viewed in FIG. 3. The bearing 108 further includes a pair of spaced legs 112 (FIG. 4) which depend from the central portion 109 on opposite sides of the rear portion 113 of the plate 40. The bearing 108 is secured to the plate 40 by means of suitable screws which extend through openings of the legs 112 and of the portion 113. The shaft 107 is mounted against sliding movement within the openings of the shears by means of suitable washer and screw assemblies 114.

Figure 10:
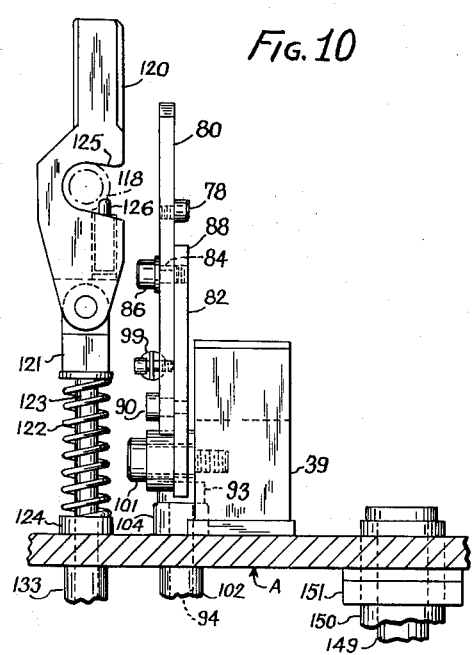
FIG. 10 is a view taken along the line 9—9 of FIG. 9.

As best viewed in FIG. 5, the shears 105 and 106 include respectively sharp lower edges 115 and 116 which are arranged to engage the material to be sheared in response to pivotal movement of the shears about the axis of the shaft 107. In order to effect such pivotal movement of the shears the right hand ends of the shears as viewed in FIG. 3 are secured together by means of a shaft 117 which extends through openings of the shears in a press fit condition and also extends through a suitable hollow tubing 118 which abuts the inner faces of the shears. The tubing 118 includes an annular restricted central portion 119 to which is connected a clevis 120 (FIGS. 9 and 10) having a lower end to which is pivotally attached a link 121. A suitable coil spring 122 surrounds a shaft 123 attached to the link 121 and is in a compressed condition between the bottom of the link 121 and a collar 124 surrounding the shaft 123 and attached to the upper face of the platform A. The clevis 120 includes a slot 125 which receives the tubing 118. A screw 126 is rotatably carried by the clevis to engage the tubing 118 within the restricted portion 119 to permit a tight connection between the clevis and the tubing.

Figure 11:
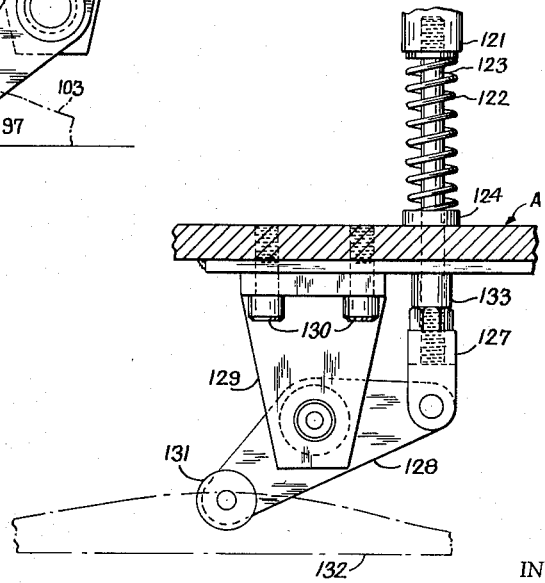
FIG. 11 is a view in front elevation of a portion of the molding device showing the cam and cam follower arrangement employed for operating the shears.

As best shown in FIG. 11, the shaft 123 extends through an opening of the platform A and has a threaded end which is threaded into an opening of a link 127 pivotally secured to a bracket 128 which is in turn pivotally attached to a support 129 secured to the under surface of the platform by suitable screws 130. Bracket 128 rotatably carries a roller 131 which is adapted to engage a cam 132 during rotation of the turntable. A stop 133 is secured to the shaft 123 for movement therewith to engage the under surface of the turntable when the roller 131 is spaced from the cam 132 as shown.

An inspection of FIGS. 4 and 11 reveals that when the bracket 128 is pivoted in a clockwise direction as viewed in FIG. 11 by engagement of the roller 131 with the cam 132 the shaft 123 is moved downwardly to also effect downward movement of the link 121 and the clevis 120 to compress the spring 122 and to cause the shears 106 and 105 to pivot in a downward direction, as viewed in FIG. 4, about the axis of the shaft 107. This movement of the shears causes their sharp edges 115 and 116 to pass across the open sides of the associated strap cavities to cut away any projecting hardened molding material. The configuration and location of the cam 121 will be described in more detail hereinafter. When the roller 131 passes over the cam 121 the spring 122 is expanded to return the parts of the shear operating mechanism to the positions shown in FIGS. 4 and 11. If the mold assembly is not mounted for movement but is fixed, the shaft 123 may be moved in response to rotation of a cam relative to the mold.

As previously stated, the gates 67 and 68 are secured to the shears 105 and 106 and are consequently moveable with the shears. To this end as shown in FIG. 3 screws 134 extend through openings of the brackets 73 into openings of the shear 105 whereas screws 135 project through openings of the brackets 74 into openings of the shear 106. Inasmuch as this mounting arrangement causes the gates to move with the shears, the gates cannot interfere with the shearing action.

In the present invention provision is also made for ejecting the hardened molded material from the strap cavities and the post cavities. Such ejecting mechanism includes a novel arrangement to effect the ejecting automatically when the molding material is sufficiently hardened within the mold cavities. The ejecting mechanism is employed in connection with an arrangement for adjusting the length of a cast post. The post length adjusting arrangement includes means for accurately varying the material-receiving volume of the post cavities independently of the ejecting mechanism so that posts of various lengths may be cast as desired.

As best shown in FIGS. 4 and 5 a pair of ejector pins 136 and 137 are located within the post cavities 34 and 35, respectively, so as to be freely slidable in vertical directions within the post cavities. The pins 136 and 137 are received within the lower open ends of the post cavities to close such lower open ends. The upper ends of the ejector pins are recessed to form pockets which receive molding material poured into the post cavities. In order to adjust the material-receiving volume of the post cavities for varying the length of a cast post provision is made for effecting predetermined sliding movement of the pins 136 and 137 within the post cavities. For this purpose a pair of screws 138 and 139 are operatively connected to the pins 136 and 137 and are rotatably mounted within vertically extending openings 140 and 141 formed respectively in the mold blocks 30 and 31 to effect sliding of the ejector pins. As best shown in FIG. 3, the openings 140 and 141 are positioned adjacent the post cavities 34 and 35 and extend parallel to the post cavities. It is noted with reference to FIG. 3 that the opening 140 and the post cavity 34 lie in a plane which is parallel to a plane including the opening 141 and the post cavity 35 and that these two planes are located on opposite sides of the central plane of the mold assembly which intersects the gates and shears.

As illustrated in FIG. 5, each of the openings 140 and 141 includes a pair of communicating openings of different diameter. The opening 140 includes an upper restricted portion 140a which communicates with a lower enlarged portion 140b, whereas the opening 141 includes an upper restricted portion 141 in communication with a lower enlarged portion 141b. It is observed that the openings 140 and 141 extend entirely through the associated mold block. The screws 138 and 139 are positioned with the screw heads within the enlarged portions 140b and 141b for sliding movement therein. The heads of the screws include tool-receiving portions to permit rotation of the screws about their axes. A suitable tool such as a screw driver is conveniently inserted in the open ends of the restricted portions 140a and 141a to engage the heads of the screws for effecting rotation thereof.

In order to connect the adjusting screws and the ejector pins so that the pins will be displaced vertically within the post cavities in response to rotation of the screws a pair of connecting members 142 and 143 are associated respectively with the pin 136 and the screw 138 and with the pin 137 and the screw 139. These connecting members each includes a threaded portion through which the threaded end of the associated screw extends in threaded engagement therewith. The threaded portions of the connecting members have split sides so that these sides may be clamped about the threaded end of the screws. The connecting members 142 and 143 also include parts which are connected to the associated ejector pins so that when the selected screw is rotated its associated connecting member will be displaced in a vertical direction as viewed in FIG. 5 to cause a corresponding movement of the associated ejector pin. These latter parts also have split sides which are clamped about restricted portions of the ejector pins. With the arrangement described a very effective and accurate adjustment of the ejector pins within the post cavities may be realized. Such adjustment is of course made prior to the pouring of liquid molding material into the post and strap cavities.

The ejector pins are preferably displaced in vertical directions by a cam and cam follower arrangement to eject the cast post and strap assemblies from the mold. For this purpose the threaded ends of the screws 138 and 139 have respectively secured thereto in any suitable manner collars 144 and 145 which are located beneath a pair of guides 146 and 147 through which the screws extend and which are attached to a table 148 engaging the lower surfaces of the collars 144 and 145. The table 148 is secured in any suitable manner to an enlarged end of a shaft 149 which extends through an opening of the turntable A and which is slidable within a hollow housing 150 also extending through the turntable A. The housing 150 has secured thereto as by a press fit a ring-shaped plate 151 which in turn is attached to the lower surface of the turntable A by suitable screws 152. The housing 150 includes at its lower end a pair of vertically extending diametrically opposed parallel slots 153 in which is located a pin 154 which extends through an opening in the lower portion of the shaft 145. A roller 155 is rotatably carried by the pin 154 for cooperation with a cam 156 fixed beneath the turntable which will be described in more detail hereinafter. The housing 150 includes a pair of diametrically opposed vertical slots 157 spaced angularly about the housing 150 from the slots 153 for accommodating the roller 155 (FIG. 8).

The table 148 is normally urged in a downward direction toward the upper surface of the turntable A as viewed in FIG. 5 so that the enlarged portion of the shaft engages the upper end of the housing 150. This is accomplished by resilient means interposed between the support plate 40 and the table 148. For this purpose a pair of shafts 158 and 159 shown in FIG. 4 have upper ends secured respectively to the depending legs 54 and 55 of the plate 40 as by screw connections and lower ends which project loosely through openings of the table 148 to be secured to the upper surface of the turntable A. A pair of coil springs 160 and 161 surround the shafts 158 and 159 respectively to engage and be in compression between the lower surfaces of the legs 54 and 55 and the upper surface of the table 148.

In operation, when it is desired to eject the cast post and strap assemblies from the mold, the roller 155 is displaced upwardly as viewed in FIG. 5 as by striking the cam 156 to effect an upward movement of the shaft 149 relative to the housing 150 to cause a corresponding upward movement of the table 148. Such movement of the table will effect compression of the springs 160 and 161 and will also cause an upward movement of the adjusting screws 138 and 139 which results in an upward movement of the ejector pins 136 and 137 through the agency of the connecting members 142 and 143. Such upward movement of the ejector pins results in the displacement of the cast material out of the post and strap cavities to release the cast material from the mold device. Inasmuch as the cast post and strap assemblies are rigidly attached to the depending lugs of the battery plates, the battery plates will also be moved upwardly in response to upward movement of the ejector pins indicating to an operator that the molding process is terminated and that he may remove the battery plates together with the cast post and strap assemblies from the mold. When the roller 155 has passed over the cam 156 the various parts of the ejector mechanism will be returned to their positions illustrated in FIG. 5 under the action of the expanding springs 160 and 161. The shafts 158 and 159 have enlarged collars 158' and 159' attached thereto which engage the underside of the table 148 to serve as stops. Of course, the shaft 149 may be moved upwardly by means other than the described cam and cam follower arrangement. For example, if the mold is stationary, a rotatable cam may be employed to move the shaft 149.

As stated previously, a plurality of tanks or containers C are provided in order to store the liquid molding material which may be of any suitable type. The molding material utilized may, for example, comprise molten lead. Other materials may be employed, but when the mold is employed to cast straps for lugs of battery plates, the material must have the required electroconductivity. The tanks C are preferably arranged and supported on the turntable A so that a separate tank is positioned in the space between adjacent ones of the mold assemblies. Inasmuch as each of the tanks C is of identical construction, the details of construction of only one of the tanks will be presented.

Figure 7:
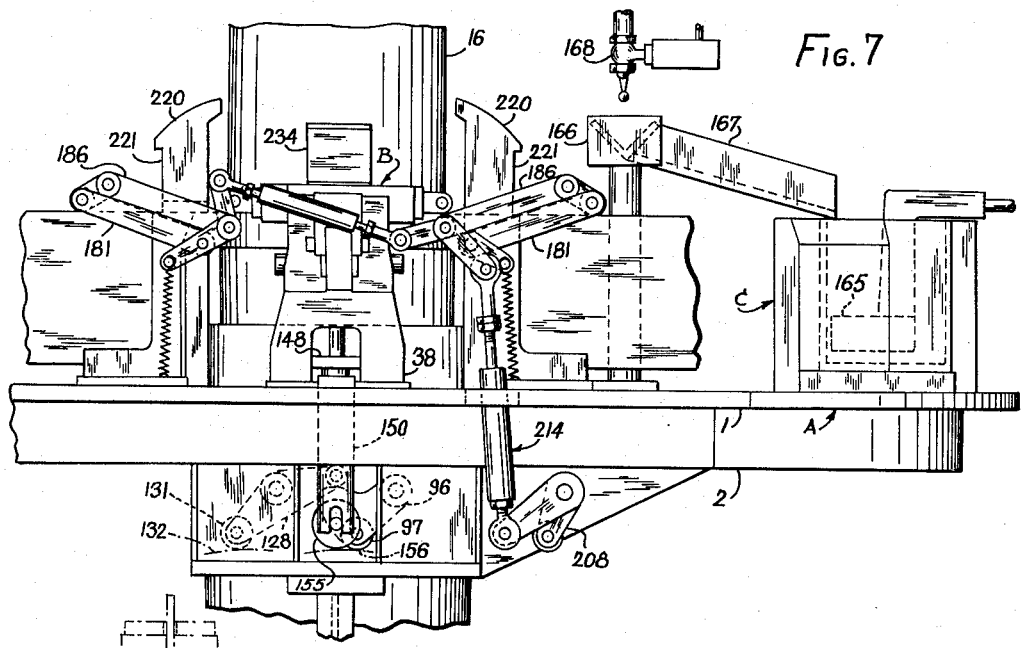
FIG. 7 is a view in front elevation of a portion of the molding device showing the pouring mechanism employed therein.

As best shown in FIGS. 1, 7 and 12, each of the tanks includes a central section 162 intermediate a pair of angularly disposed end sections 163 and 164 which face the sides of the adjacent mold assemblies. A heat resistant liner may be located within the tank if desired. A suitable heating element 165 is carried by the tank at its central section 162 to extend downwardly adjacent the bottom of the tank so as to be submerged in the molding material. The heating element is effective when heated to maintain the molding material in a molten state. It is desirable that the tank C be continuously filled with the molding material and for this purpose an auxiliary tank 166 is provided which is located toward the axis of the turntable to supply molding material to the tank C through a suitable trough 167 connected between the tank 166 and the tank C. The auxiliary tank 166 may receive molding material from a suitable storage vat through a piping arrangement and a lead valve 168 positioned above the tank 166. The lead valve 168 may be controlled automatically to supply liquid molding material to the tank 166 in response to depletion of material in the tank C. Other arrangements may also be employed, such as having the valve 168 directly above the tank C and omitting the tank 166 and trough 167.

In order to remove molding material from the tank C and to pour the removed material into the cavities of the adjacent mold assemblies there is provided according to the present invention a novel pouring arrangement including a plurality of dipper assemblies D. Each of the tanks C is associated with a pair of dipper assemblies with each dipper assembly including a ladle or dipper 169. Inasmuch as each of the dippers 169 is of identical construction, only one such dipper need be described in detail.

Figure 17:
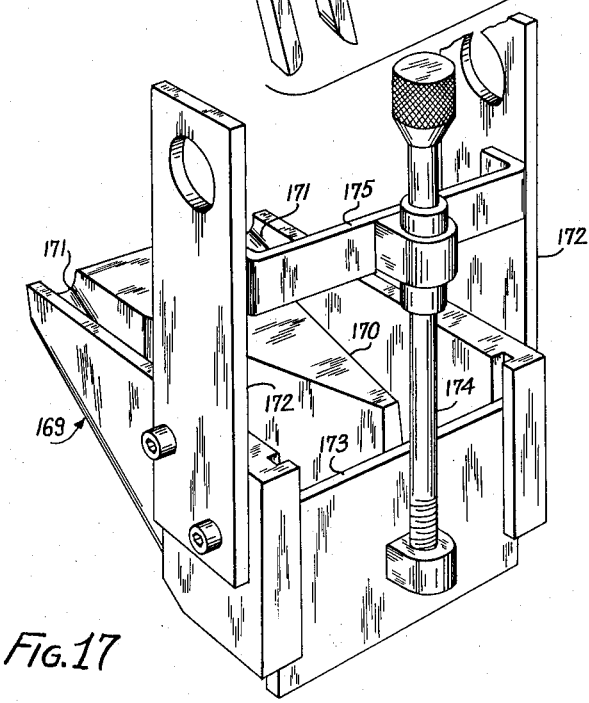
FIG. 17 is a view in perspective showing a dipper with an adjustable back plate.

As best shown in FIGS. 12 and 17, the dipper 169 includes a base section having an upstanding central portion 170 which defines a pair of spaced troughs 171 constituted by the base section and sides of the portion 170. The dipper is suspended from a mechanism described hereinafter by means of a pair of spaced supports 172 which are connected to opposed sides of the dipper to extend vertically in parallel planes. The rear of right-hand end of the right hand one of the dippers as viewed in FIG. 12 is of open construction and is closed by an adjustable plate 173 slidably mounted within grooves formed on the sides of the dipper in a vertical direction as viewed in FIGS. 13 and 17. Adjustment of the plate 173 is effected by rotation of an adjusting screw 174 (FIG. 17) journalled in a bracket 175 which is carried by the supports 172. The threaded end of the screw 174 is threaded into a threaded cavity of a boss of the plate 173. In order to adjust the plate 173 to vary the amount of molding material receivable in the dipper it is only necessary to rotate the screw 174. The direction of rotation of the screw 174 determines whether or not the plate 173 is lowered or raised to allow the dipper to accommodate respectively less or more of the molding material.

In the present invention provision is made for causing movement of the dippers associated with each mold assembly to effect simultaneous removal of material from the tank C and simultaneous pouring of the removed material into the mold assembly. The details of such material removing and pouring mechanism may now be described.

A pair of dipper shaft assemblies 176 are provided each for a separate one of the dippers associated with one of the mold assemblies. The assemblies 176 are of identical one-piece formation and the left hand one of the assemblies 176 as viewed in FIG. 12 is shown only in part. As best shown in FIG. 12, each of the assemblies 176 includes a shaft 177 which is rigidly secured to the spaced supports 172 in any suitable manner. The shafts 177 extend parallel to each other and have affixed thereto at their lower ends as viewed in FIG. 12, as by welding, cross pieces 178 to the outer ends of which are rigidly secured pins 179 which rotatably support rollers 180. Suitable links 181 are pivotally carried at their outer ends by the pins 179 and have affixed thereto at their inner ends pins 182 to which are pivotally secured arms 183 which are connected to identical one-piece dipper arm assemblies 184.

The dipper arm assemblies 184 include hollow tubular housings 185 in which are journalled the shafts 177 of the assemblies 176. The assemblies 184 include further cross pieces 186 affixed to the houings 185 as by welding which carry at their inner end shafts 187 extending loosely through openings of the arms 183 so that the arms 183 may pivot about the shafts 187. The arms 183 carry pins 188 to which are secured upper ends of coil springs 189 as viewed in FIG. 13, having lower ends attached to pins 190 secured to suitable supports 191 which are mounted on the upper surface of the turntable A.

The shafts 187 are journalled within hollow tubular housings 192 (FIG. 12) forming parts of supporting brackets which are affixed to the supports 191 in any suitable manner. The shafts 187 of the right hand one of the assemblies 184 as viewed in FIG. 12 is associated with a member 193 including a hollow tube 194 through which this shaft 187 extends in keyed relation with the tube 194. The member 193 includes additionally a cross arm 195 affixed to the tube 194 as by welding which carries a cross pin 196 which in turn is operatively connected to suitable cam follower means 197 for cooperation with cam means fixed beneath the turntable as will be described in detail hereinafter. The member 193 includes further an additional cross arm 198 which is affixed to the tube 194 and which carries a cross pin 199 operatively connected to one end of a spring assembly 200. The remaining end of the spring assembly 200 is connected to a link and tube assembly 201 which is keyed to the shaft 187 of the left hand one of the assemblies 184 as viewed in FIG. 12.

The spring assembly 200 includes a hollow tubular housing 202 having part fixed therewithin adjacent one end thereof in which is threadably received a screw 203 having an enlarged end with an opening through which extends a pin 203 forming part of the assembly 201. The assembly 200 also includes a rod 204 which is slidable within the housing 202 at the other end of the housing under the control of a spring within the housing such that when the rod 204 is moved outwardly of the housing the spring within the housing is compressed. The rod 204 is threaded into a member 205 which has an enlarged end with an opening through which the pin 199 extends.

With the above described arrangement movement of the arm 195 in either direction about the axis of the associated shaft 187 is effective to cause simultaneous movement of the associated dippers 169. In order to effect such movement of the arm 195 the cam follower arrangement 197 is connected to the arm 195 to cooperate with a cam 206 (FIG. 14) described hereinafter. The follower arrangement 197 is shown in FIGS. 13, 14 and 15 and includes a roller 207 which is rotatably mounted by a link 208 which is affixed to the rear end of a shaft 209 journalled in a hollow tubular part 209 of the frame 210 which is attached to the underside of the turntable A. The shaft 209 also has secured thereto at its front end a link 211 to which is pivotally connected a screw 212 threaded into a part fixed within the housing 213 of a spring assembly 214, which may be similar in construction to the spring assembly 200. A connecting rod 215 is slidable within the housing in the manner of the rod 204 of the assembly 200 and is connected to a member 215 which is pivotally secured to the cross pin 196. The screws 203 and 212 of the assemblies 200 and 214 may be rotated with respect to the associated housings to move such screws axially of the housings for adjusting the positions of parts of the described mechanism. The parts in FIG. 15 are shown in the same positions which they occupy in FIGS. 12 and 13.

The various part of the pouring mechanism just described have normal inoperative positions shown in FIG. 13 when the roller 207 is spaced from the cam 206. For such positions the dippers 169 are located within the tanks C to be substantially filled with liquid molding material within the tank. The cam 206 is fixed beneath the turntable in a preselected position and includes a pair of cam surfaces. As shown in FIG. 14 the cam 206 includes an upwardly inclined surface 216 which is joined to a downwardly inclined surface 218 having a greater slope then the surface 216.

When the roller 207 strikes the inclined surface 216 of the cam 206 and moves upwardly therealong the parts of the pouring mechanism are displaced from their positions illustrated in FIG. 13 in a manner such that the dippers 169 are raised upwardly from the tank C toward the intermediate mold assembly and tilted to pour the molding material therefrom into the gates of the mold assembly. This may be explained by considering that when the roller 207 begins to ride over the upwardly inclined surface 216 of the cam the roller 207 as viewed in FIGS. 13 and 14 is moved in a clockwise direction which effects movement of the link 208, the shaft 209, and the link 211 in such clockwise direction. This movement is effective to elevate the spring assembly 214 and the connecting rod 215, which elevation causes rotation of the arm 195 and the tube 194 affixed thereto about the axis of the tube 194 in a counter-clockwise direction, as viewed in FIG. 13. Since the tube 194 is keyed to the right hand shaft 187 such counter-clockwise movement is effective to cause a corresponding movement about the axis of the tube 194 of the shaft 187, the cross piece 186 attached thereto and the housing 185 attached to the cross piece 186. Inasmuch as shaft 177 is carried by the housing 185 it is also moved in a counter-clockwise direction about the axis of tube 194 to effect a corresponding movement of the attached dipper 169. Since the right hand cross piece 178 is secured to the shaft 177, such cross piece will be moved with the shaft 177 during movement of the housing 185 to carry therewith the roller 180 and the link 181. The shaft 177 is journalled in the housing in a clockwise direction due to gravity during movement of the housing so that pouring of material from the dipper at this time does not occur.

It is noted that when the tube 194 is rotated in the counter-clockwise direction it carries the arm 198 therewith to move the housing 202 and the screw 203 downwardly and toward the right as seen in FIG. 13. Such movement of the screw 203 effects clockwise movement of the link 201 and the shaft 187 of the left hand one of the dipper assemblies, as viewed in FIG. 13, which shaft is keyed to a tube 219 forming part of the assembly 201. The clockwise rotation of this shaft 187 results in movement of the associated dipper upwardly from the tank C toward the intermediate mold assembly. When the screw 203 is adjusted so that the associated dipper assumes a position corresponding to that of the right hand one of the dippers, passage of the roller 207 along the surface 216 will effect movement of the various associated parts so that the two dippers are moved simultaneously.

Continued movement of the roller 206 along the inclined cam surface 216 effects a continuation of the above described movements of the parts of the pouring mechanism until the rollers 180 are elevated into engagement with upwardly extending curved surfaces 220 of a pair of cams 221 carried by the supports 191. When the rollers 180 strike the cam surfaces 220 of the cams 221 and begin to travel therealong as shown in FIG. 14 the associated dippers are gradually tilted to positions wherein the material therein is poured into the gates and guided therefrom into the mold cavities of the mold assembly. This may be explained by considering that when the right hand roller 180 moves along the cam surface 220 the cross piece 178 is moved upwardly with the roller 180 to thereby effect rotation of the attached right hand shaft 177 in a counter-clockwise direction. Such rotation of the shaft 177 effects rotation of the associated dipper 169 in the counter-clockwise direction with the shaft 177 to effect pouring of the liquid material therein. During this time a similar sequence of movements of the parts associated with the left hand dipper is occurring. When such pouring is initiated the dippers are positioned so that the poured material will flow into the gate assemblies of the mold previously described. Movement of the dippers in the pouring direction is limited by a pair of stop means only one of which is shown. Each of the stop means may conveniently comprise a threaded screw 222 which is threaded into a bracket 223 carried by the cam 221 to engage the link 181. Adjustment of the screws 222 is effective to vary the pouring positions of the dippers as desired.

When the right hand roller 180 is traversing the cam surface 220 it is noted that the link 181 is displaced upwardly to a certain extent relative to the shaft 187 so that the pin 182 carried thereby is also moved upwardly to effect counter-clockwise movement of the arm 183 about the shaft 187. This action causes expansion of the spring 189 which serves as a restoring mechanism to assure return of the dipper to the tank after the roller 207 has passed over the cam 206. A similar action takes place with respect to the left hand spring.

The cam 206 includes a peak 217 over which the roller 207 passes subsequent to its passage over the upwardly inclined surface 216. When the roller is passing over the peak 217 the parts of the pouring mechanism are in positions illustrated in FIG. 14. The pouring is completed by movement of the roller 207 over the peak 217 down the inclined surface 218 of the cam 206 which has a more severe slope than the surface 216. As a result, the movements of the parts of the pouring mechanism described in connection with the passage of the roller 207 over the surface 216 are reversed as the roller traverses the surface 218 and such movements occur at a faster rate. During this time the dippers are quickly rotated from their pouring positions and are dropped downwardly into the tank C simultaneously to be submerged within the material therein so as to again become filled with such material.

The described pouring mechanism may be employed to operate a single dipper, such as the right hand dipper of FIG. 13 by merely omitting parts of such mechanism associated with the left hand dipper. In addition, the mechanism may be operated by means other than the described cam and cam follower arrangement. As an example, if the mold is fixed against movement, a rotatable cam may be used to effect the desired rotation of the arm 195.

The control cams including the gate cam 103, the shear cam 132, the ejector cam 156 and the pour cam 206 are supported by a plurality of spaced stands 224, only one of which is shown in FIG. 8, which are mounted on the base structure 14 to extend upwardly toward the underside of the turntable A. The stands 224 carry a curved arcuate plate 225 at their top which mounts a plurality of curved arcuate segments 226, 227, 228 and 229 to which are secured respectively the cams 97, 132, 156 and 206. The cams may be secured to their segments in any suitable manner such as by welding. It is noted that the cams are also curved so that when mounted they curve about the axis of the shaft 16 to allow the rollers of the rotating cam followers to properly engage the cam surfaces thereof. If the turntable A is replaced by a supporting structure which mounts the molds for movement along a path such as a straight line path, then the plate 225, the segments 226, 227, 228 and 229 and the cams 97, 132, 156 and 206 may be formed without the described curvatures.

The cams are mounted so that they may be adjusted about the axis of the shaft 16 for permitting variation of the timing between the various operations if desired. For this purpose the segments 226, 227, 228 and 229 have formed herein respectively pairs of arcuate slots 230, 231, 232 and 233, which receive screws threaded into openings of the plate 225. With this arrangement the segments may be adjusted through a limited angle about the axis of the shaft 16 upon loosening the screws and then may be secured in the adjusted positions by tightening the screws.

The spacing of the cams relative to one another angularly about the axis of the shaft 16 determines the timing of the various camming operations. Such spacing is arranged so that the operation of the pour mechanism, gate mechanism, shear mechanism and ejector mechanism is effected in the order named with a proper time interval therebetween. The pouring operation is the initial operation and is performed subsequent to loading of the battery plates in the mold assemblies. Such loading is performed by an operator positioned so that he can readily remove ejected battery plates from the molds as the ejector rollers 155 of the molds pass by the ejector cam. The operator replaces the plates ejected from a mold with a new set of plates prior to arrival of the pour roller 207 of this mold to the pour cam. The entire molding operation is then performed automatically for approximately a complete revolution of the turntable.

The pour cam 206 and the gate cam 103 are arranged so that the leading edges of their cam surfaces are spaced angularly about the shaft 16 by a substantial angle which may be of the order of two hundred and fifty degrees. This substantial angle is desirable so that the liquid molding material poured into the mold cavities will have sufficient time to cool and solidify prior to arrival of the gate roller 97 of the mold at the gate cam. It is observed that the rollers of the several cam followers of each mold are also spaced angluarly about the axis of the shaft 16. As viewed in FIG. 2 the pour roller 207 is at an extreme counter-clockwise position with the gate roller 97, ejector roller 155, and shear roller 131 following in that order in a clockwise direction. As a result of such roller arrangement, the various cams must be spaced angularly about the shaft 16 accordingly so that such angular spacing of the rollers is accounted for to give the proper timing and sequence of the various operations. It is noted also that the rollers associated with each mold are located in paths which are spaced radially of the shaft 16. This radial spacing of the rollers necessitates a corresponding radial spacing of the paths in which the various cams are included. As shown in FIG. 8, the ejector cam, pour cam, gate cam and shear cam are in paths which are spaced radially from left to right in the order named.

The configurations of the cams are selected so that proper operation of the dippers, gates, shears and ejector is obtained. The cams for operating these mechanisms are of the uniformly accelerated motion type with the camming surfaces thereof curving gradually upwardly to a peak and then curving downwardly. If the cast strap and post is to be cast on lugs of battery plates then the desired number of battery plates are arranged in stacked relation with the positive and negative plates in alternating relation with insulating spacers therebetween so that the lugs of the positive plates are on one side of the stack and the lugs of the negative plates are on the other side of the stack. The stack is then placed by an operator between a pair of clamp springs 234 of a mold so that the lugs of the positive plates are within one of the strap cavities and the lugs of the negative plates are within the other of the strap cavities. The clamp springs 234 are formed of resilient material such as spring steel to be of generally L-shaped configuration having securing portions 235 and angularly relative portions 236 which engage the stacked battery plates, as best shown in FIGS. 3, 5, and 6.

The springs 234 are adjustable relative to each other in directions parallel to the directions of extension of the strap cavities so as to accommodate battery plate stacks of varying thicknesses. To this end the clamp springs are adjustably mounted by blocks 237 which are in turn adjustably secured to the plate 40 by screws 238 extending through elongated openings of the blocks 237 into openings of the plate 40. Coil springs 239 (FIG. 5) surround the screws 238 within housings 239 and are compressed between the blocks 237 and the plate 40 so as to space the blocks 237 from the plates 40. Each of the portions 235 of the clamp springs includes a pair of parallel elongated slots 240 which open at edges of the portions 235. These slots receive screws 241 which are threaded into openings of the blocks 237. When the screws 241 are loosened the springs 234 may be adjusted on the blocks toward and away from each other to vary the spacing therebetween. The clamp springs are secured in their adjusted positions by tightening of the screws 241.

The blocks 237 each includes a pair of wings 242 which extend outwardly thereof to bridge the strap cavities. Located within each of the strap cavities beneath these wings is a pair of cavity-filling plugs which are adjustable along the strap cavities to vary the material-receiving length of the strap cavities. As best shown in FIGS. 3 and 5 a pair of plugs 243 are positioned within the strap cavity 32 spaced at opposite ends thereof and a pair of plugs 244 are similarly positioned in the strap cavity 33. The plugs 243 and 244 are formed to have cross-sectional areas taken in planes transverse to their lengths which are of substantially identical configuration as cross-sectional areas of the strap cavities taken in similar planes. The wings 242 of the blocks 237 engage the plugs 243 and 244 when the screws 238 are tightened to hold the plugs 243 and 244 in position within the strap cavities. If it is desired to adjust the plugs 243 and 244 along the strap cavities it is only necessary to loosen the screws 238 which effects elevation of the blocks 237 and disengagement of the wings 242 from the plugs 243 and 244 by expansion of the springs 239. The plugs 243 and 244 may then be adjusted along the strap cavities to obtain the desired material-receiving lengths of the strap cavities.

In operation the several molds, which in the illustrated embodiment number six, are prepared for the molding operation by effecting the desired adjustments of the springs 234, the plugs 243 and 244 and the ejector pins. A stack of battery plates is then prepared and inserted between the springs 234 of one of the molds. Rotation of the turntable A is then initiated by actuation of a suitable switch to energize the motor 22 which effects rotation of the turntable and the molds in a counterclockwise direction as viewed in FIG. 1. As the molds rotate, the pour roller of the one mold will engage the pour cam and travel along the cam surface thereof. This causes the dippers associated with this mold to pour material into the gates of this mold from which the poured material is guided into the strap cavities and the post cavities. This mold then continues to rotate toward the gate cam during which time the liquid material in its mold cavities is cooling and assuming a hardened condition. During this time the following molds are being loaded and are passing over the pour cam and are receiving molding material from the associated dippers.

When the first mold arrives at the gate cam, the gate roller of the first mold engages the gate cam and the associated gates are simultaneously pivoted downwardly away from the sides of the mold blocks into their inoperative positions. Such movement of the gates exposes for shearing unwanted hardened material which projects outwardly from the sides of the mold blocks. Subsequent to operation of its gates the shear roller of the first mold is rotated toward the shear cam and when the shear roller engages the shear cam the shears are pivoted downwardly simultaneously so that the sharp edges pass across the open sides of the strap cavities to cut away the projecting hardened material which drops away to be led to the floor by a suitable trough.

As the shear roller is rotated past the shear cam the ejector roller eventually engages the ejector cam to effect elevation of the ejector pins which release the hardened material from the post and strap cavities. The molding operation is now terminated after slightly less than a complete revolution of the turntable. The operator now removes the battery plate stack with the assembled straps and posts and replaces it with a new stack of plates prior to arrival of the pour roller of this mold at the area of the pour cam. The following molds of course are being rotated and are being operated in the same manner as the first mold. The speed of rotation of the turntable is selected such that the operator may conveniently remove the completed stack assembly from each mold and replace it with a new stack.

Figure 18:
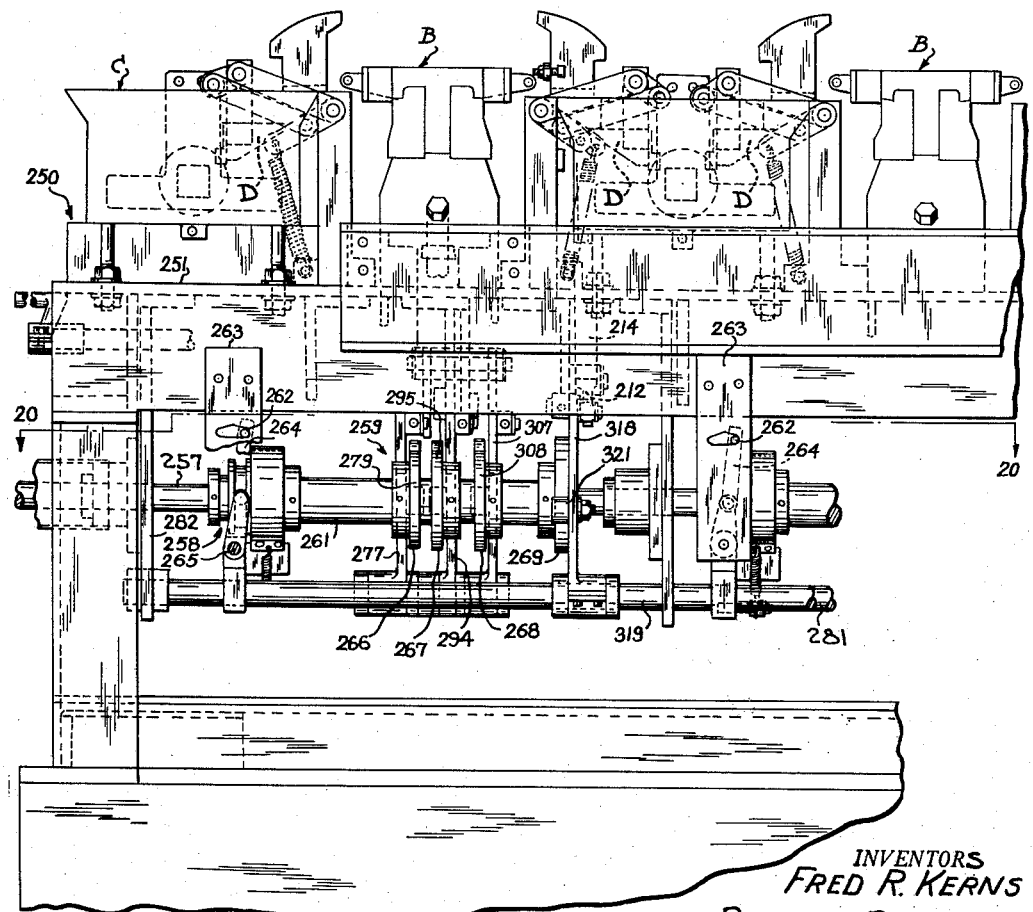
FIG. 18 is a view in front elevation of an embodiment of the present invention in which the molds are operated by moveable cam means.
Figure 19:
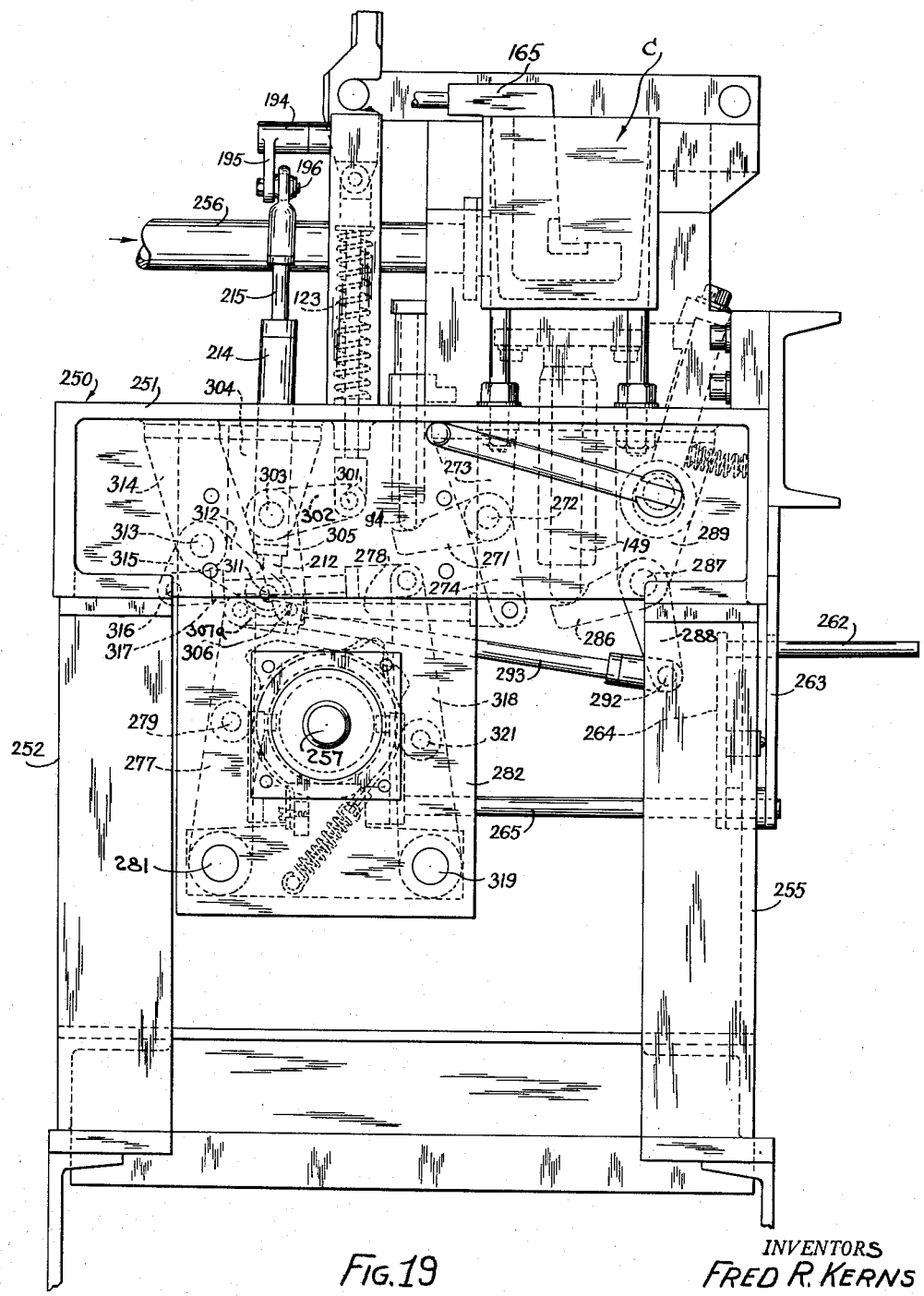
FIG. 19 is a view in side elevation of the embodiment of the present invention of FIG. 18.
Figure 20:
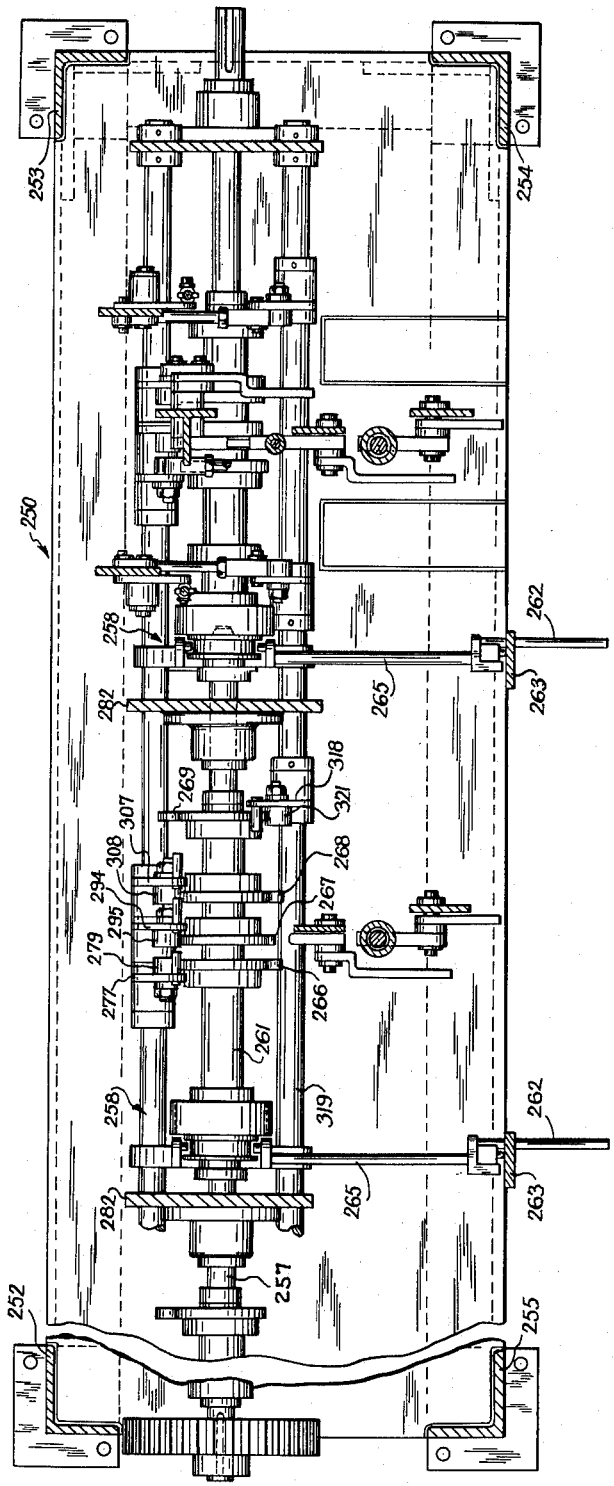
FIG. 20 is a view taken along the line 20—20 of FIG. 18.

As mentioned hereinbefore the individual molding units of the present invention are adapted for operation either through movement along a predetrmined path relative to fixed cam means as described hereinbefore or they are adapted for operation by moveable cam means, the individual molding units themselves being stationary. An embodiment of the present invention in accordance with this latter mode of operation is illustrated in FIGS. 18, 19 and 20. Referring now to these figures, similar reference characters have been employed to designate components similar to those utilized in the embodiment of the present invention described hereinbefore and illustrated in FIGS. 1 through 17. As shown, the mold assemblies B, tanks C and dipper means D are mounted on a table 250 having a top 251 which is supported at its corners by the vertical angles 252, 253, 254 and 255. The mold assemblies B, tanks C and dipper means D are identical to those in the embodiment of the present invention described hereinbefore. Accordingly, the details of these parts will not be described again. Since these parts are stationary in this embodiment of the present invention, a different system of lead feeding is applicable. Each of the tanks C is supplied with molding material by means of an input pipe 256 from a common source (not shown). As in the other embodiment of the present invention each tank C has its own individual heater 165 which maintains the molding material therein at the proper temperature for the molding operation.

The operation of the various mechanisms which carry out the molding steps is effected from a rotating cam shaft 257 which is driven in the conventional manner by means not shown. Since the operating mechanisms for each of the molding units are identical, only the mechanism for one will be described. In this embodiment of the present invention, each of the individual molding units may be taken out of service by means of a clutch mechanism generally designated 258 which is operable to connect and disconnect the molding unit operating cams, generally designated 259, from the shaft 257. To this end, the operating cams 259 are mounted on a sleeve 261 which is adapted for rotation with the main power shaft 257 when the clutch mechanism 258 is engaged. The clutch 258 cam is operative by means of a clutch handle 262 which projects from the front of the machine through an opening in a front plate 263. As shown, the clutch handle 262 is attached to an arm 264 which is in turn affixed to a clutch operating bar 265.

The operating cams 259 include a cam for each of the four basic molding operations. These cams include a gate operating cam 269. Each of these cams is mounted on the sleeve 261 in such a manner as to effect its associated operation in accordance with the time sequence described hereinbefore in connection with the other embodiment of the present invention.

Considering first the operation of the pouring gate, the gate operating pin 94 extends downward through an opening in the table top 251 and engages a lever arm 271. The vertical movement of the gate operating pin 94, throught engagement with the lever arm 271, effects pouring gate operation in the same manner as when the vertical motion is achieved by means of the cam and follower action described in connection with the other embodiment of the present invention. The lever arm 271 is affixed to a pin 272 which is journaled in a suitable bracket 273 which extends downward from the bottom of the table top 251. The pin 272 also has affixed thereto a lever arm 274 which is connected to a cam follower arm 277 by means of a bar 278. The cam follower arm 277 carries thereon a cam follower 279 which is adapted to engage the gate operating cam 266 to affect the operation of the pouring gates. As shown, the cam follower arm 277 is pivotally mounted on the bar 281. The bar 281 which runs the length of the machine is supported at its ends by a suitable bracket 282 which extends downward from the table top 251. As will be explained in more detail hereinafter, the bar 281 is similarly utilized for the mounting of two other cam follower arms.

In the operation of the pouring gate mechanism, when the cam follower 279 engages the lifting surface of the gate operating cam 266, the cam follower arm 277 is rotated counter-clockwise on the bar 281 which causes the lever arm 274 to be turned in a clockwise direction due to the bar 278 linking the cam follower arm 277 with the lever arm 274. As the lever arm 274 turns in a clockwise direction, the lever arm 271 forces the gate operating pin 94 to move upwards to effect the pouring gate operation.

Considering next the operation of the ejector mechanism of the pouring units B, the ejector operating shaft 149 in this embodiment of the present invention extends downward through a suitable opening in the table top 251. The end of the pin 149 engages a lever arm 286 which is affixed to a pin 287. The pin 287 is in turn journaled in a suitable bracket 289 which extends downward from the bottom of the table top 251. The pin 287 also has affixed thereto a lever arm 288, which is connected to a cam follower arm 294 by means of a connecting bar 293. The cam follower arm 294 carries on it the cam follower 295 which is adapted to engage the ejector cam 267 for the operation of the ejector mechanism. The cam follower arm 294 is journaled on the bar 281 and hence is adapted for rotation under the influence of the cam 267.

In the operation of the ejection mechanism, when the cam follower 295 engages the lifting surface of the cam 267, the cam follower arm 294 is rotated counter-clockwise on the bar 281 causing the lever arm 286 to be rotated in a clockwise direction due to the linkage comprising the lever arm 288 and the bar 293. As the lever arm 286 turns in a clockwise direction it forces the ejector operating shaft 194 to move upward to affect the ejecting operation.

Considering next the operation of the shearing mechanism, the shaft 123, which affects the operation of the shearing mechanism extends downward through an opening in the table top 251 for connection with the shearing cam operating means. The end of the shaft 123 carries a pin 301 having attached thereto a lever arm 302. The other end of the lever arm 302 is affixed to the shaft 303 which is journaled in the bracket 304 extending downward from the underside of the top 251 of the table 250. Also attached to the shaft 303, which has a connecting lever 305, the other end of which is connected to a cam follower arm 307 by means of a link 307a. The cam follower arm 307 carries cam follower 308 which is adapted to engage the shearing operating cam 268 to affect the shearing operation. As shown, the cam follower arm 307 is pivotally mounted on the bar 281.

In the operation of the shearing mechanism, when the cam follower 308 engages the lifting surface of the shearing operating cam 268, the cam follower arm 307 is caused to rotate in a counter clockwise direction causing the lever 203 to be turned in a clockwise direction which pulls the shaft 123 downward to effect the shearing operation.

Considering next the operation of the pouring mechanism, the spring assembly 214 extends downward through an opening in the top 251 of the table 250 for operation by the cam and cam follower mechanism. The arm 212 of the spring assembly 214 is journaled on a pin 311 which is carried by a link 312. The link 312 is in turn affixed to a pin 313 journaled in a bracket 314 extending downward from the bottom of the table top 251. The pin 313 has affixed thereto a link 315 which is connected to the connecting rod 317 by means of a pin 316. The connecting rod 317 connects the link 315 with the cam follower arm 318. The cam follower arm 318 carries a cam follower 321 which is adapted to engage the pouring cam 269. The cam follower arm 318 is journaled on a rod 319 which extends between the downwardly extending brackets 282 which also support the bar 281.

In considering the operation of the pouring mechanism, when the cam follower 321 engages the lifting surface of the pouring cam 269 the cam follower arm 318 is rotated in a clockwise direction on the bar 318. The clockwise rotation of the cam follower arm 318 affects the upward movement of the bar 212 of the spring assembly 214 through the linkage comprising the connecting rod 317 and connecting links 315 and 312. The upward or vertical movement of the arm 212 is operative to effect the pouring operations described hereinbefore in connection with the other embodiment of the present invention.

From the foregoing it can be seen as the shaft 257 is driven, affecting the rotation of the operating cam 259 that the operating mechanism controlling the gate, pouring, shearing and ejector mechanism which are integral parts of the casting operation to be affected. Thus, there has been provided a strap and post casting apparatus which is adaptable for operation either by means of moveable cams or by motion along a predetermined path relative to fixed cam means. As a result, the casting machine of the present invention is readily adapted for integration and the existing assembly lines where floor space or the location of existing machinery dictates that the machine be operated in either of the two modes described.

Having described my invention, we claim:

1. In a molding device, means having a mold cavity for receiving liquid molding material, said cavity having a side open throughout the length of the cavity, a gate having a trough portion for receiving molding material and guiding the received material to the cavity through the open side, means mounting said gate for movement about a first axis generally parallel to the length of the cavity between an operative position wherein the trough is aligned with the open side to permit guiding of material thereto, and an inoperative position wherein the trough is misaligned from the open side, a shear lever independent of said gate, and means mounting said lever for pivotal movement about a second axis transverse to the first axis across the open side of the cavity, said gate being secured to said shear lever for movement therewith.

2. In a molding device, means having a mold cavity for receiving a hardenable liquid molding material, said cavity having a side open throughout the length of the cavity, a gate having a trough portion for receiving liquid molding material and guiding the received material to the cavity through the open side, means mounting said gate for movement about a first axis generally parallel to the length of the cavity between an operative position wherein the trough is aligned with the open side to permit guiding of material thereto, and an inoperative position wherein the trough is misaligned from the open side, a shear lever independent of said gate, means mounting said lever for pivotal movement about a second axis transverse to the first axis across the open side of the cavity, and means for automatically moving said gate from its operative position to its inoperative position subsequent to hardening of molding material within said cavity, and for moving said shear lever across said open side subsequent to movement of the gate to its inoperative position for shearing hardened material extending from said open side externally of said cavity.

3. In a molding device, means providing a pair of spaced parallel extending mold cavities for receiving hardenable liquid molding material, each of said cavities having a side open throughout the length of the cavity, a pair of gates each having a trough portion for receiving molding material and guiding the received material to a separate one of the cavities through the open sides, means mounting said gates for movement about spaced first axes generally parallel to the directions of extension of the cavities between operative positions wherein the troughs are aligned with the open sides to permit guiding of material thereto, and inoperative positions wherein the troughs are misaligned from the open sides, means for automatically moving said gates simultaneously from their operative positions to their inoperative positions subsequent to hardening of molding material within the cavities, a pair of spaced shear levers independent of said gates, means mounting said levers for movement as a unit about a second axis transverse to the first axes across the open sides of said cavities, and means for automatically moving said shear levers across said open sides subsequent to movement of said gates to their inoperative positions.

4. A molding device comprising means having a mold cavity for receiving a hardenable liquid molding material, said cavity having a side open throughout the length of the cavity, a gate having a trough portion for receiving liquid molding material and guiding the received material to the cavity through the open side, means mounting said gate for movement about a first axis generally parallel to the length of the cavity between an operative position wherein the trough is aligned with the open side to permit guiding of material thereto, and an inoperative position wherein the trough is misaligned from the open side, a shear lever independent of said gate means mounting said lever for pivotal movement about a second axis transverse to the first axis across the open side of the cavity, ejection pin means, means for mounting said pin means for sliding movement within said cavity for ejecting hardened molding material, and means for automatically moving said gate from its operative position to its inoperative position subsequent to hardening of molding material within said cavity, for moving said shear lever across said open side subsequent to movement of the gate to its inoperative position for shearing hardened material extending from said open side externally of said cavity, and for operating said pin means to eject hardened material subsequent to the movement of said shear lever.

5. Molding device as specified in claim 4 wherein said last named means are actuated through the movement of said molding device relative to fixed cam means.

6. Molding device as specified in claim 4 wherein said last named means are actuated by movable cam means.

References Cited in the file of this patent

UNITED STATES PATENTS

| | | |
|---|---|---|
| 1,948,120 | Lormor | Feb. 20, 1934 |
| 1,956,870 | Mayer | May 1, 1934 |
| 2,029,673 | Roshirt | Feb. 4, 1936 |
| 2,302,269 | Simonds | Nov. 17, 1942 |
| 2,547,082 | Lund | Apr. 3, 1951 |
| 2,736,934 | Lormor | Mar. 6, 1956 |